United States Patent
Squiller et al.

(10) Patent No.: US 9,944,821 B2
(45) Date of Patent: Apr. 17, 2018

(54) POLYASPARTIC COATING COMPOSITIONS

(71) Applicant: Covestro LLC, Pittsburgh, PA (US)

(72) Inventors: Edward P. Squiller, Bridgeville, PA (US); Terrell D. Wayt, Moundsville, WV (US); John Forsythe, Allison Park, PA (US); Kurt E. Best, Sewickley, PA (US); Ahren Olson, Aliquippa, PA (US); Alan Ekin, Coraopolis, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 14/774,963

(22) PCT Filed: Mar. 13, 2014

(86) PCT No.: PCT/US2014/025420
§ 371 (c)(1),
(2) Date: Sep. 11, 2015

(87) PCT Pub. No.: WO2014/151307
PCT Pub. Date: Sep. 25, 2014

(65) Prior Publication Data
US 2016/0024339 A1    Jan. 28, 2016

Related U.S. Application Data

(60) Provisional application No. 61/787,538, filed on Mar. 15, 2013.

(51) Int. Cl.
*C09D 175/02* (2006.01)
*C08G 18/79* (2006.01)
*C08G 18/32* (2006.01)
*C08G 18/38* (2006.01)

(52) U.S. Cl.
CPC ....... *C09D 175/02* (2013.01); *C08G 18/3256* (2013.01); *C08G 18/3821* (2013.01); *C08G 18/792* (2013.01)

(58) Field of Classification Search
CPC ............... C09D 175/02; C08G 18/792; C08G 18/3821; C08G 18/3256
See application file for complete search history.

(56) References Cited

U.S. PATENT DOCUMENTS

| | | |
|---|---|---|
| 3,001,973 A | 9/1961 | Piepenbrink et al. |
| 3,124,605 A | 3/1964 | Wagner |
| 3,152,162 A | 10/1964 | Fischer et al. |
| 3,201,372 A | 8/1965 | Wagner |
| 3,394,164 A | 7/1968 | McClellan et al. |
| 3,644,457 A | 2/1972 | Konig et al. |
| 5,126,170 A | 6/1992 | Zwiener et al. |
| 5,236,741 A | 8/1993 | Zwiener et al. |
| 5,243,012 A | 9/1993 | Wicks et al. |
| 5,489,704 A | 2/1996 | Squiller et al. |
| 5,623,045 A * | 4/1997 | Zwiener ............ C08G 18/3256 427/385.5 |
| 5,717,091 A | 2/1998 | Richter et al. |
| 5,736,604 A | 4/1998 | Luthra |
| 6,169,141 B1 * | 1/2001 | Kurek ............... C08G 18/3234 524/372 |
| 6,458,293 B1 | 10/2002 | Roesler et al. |
| 6,774,206 B2 * | 8/2004 | Danielmeier ......... C07C 229/24 525/411 |
| 6,774,207 B2 * | 8/2004 | Danielmeier ......... C07C 229/24 525/411 |
| 6,790,925 B2 * | 9/2004 | Danielmeier ...... C08G 73/1092 252/182.28 |
| 6,833,424 B2 | 12/2004 | Milhem |
| 7,169,876 B2 | 1/2007 | Asher |
| 2004/0110917 A1 | 6/2004 | Danielmeier et al. |
| 2006/0247371 A1 | 11/2006 | Mundstock et al. |

FOREIGN PATENT DOCUMENTS

| | | |
|---|---|---|
| CN | 101074280 A | 11/2007 |
| WO | 2011126562 | 10/2011 |
| WO | 2013026804 | 2/2013 |

OTHER PUBLICATIONS

Angeloff, et al., Two-component aliphatic polyurea coatings for high productivity applications, Journal of Protective Coatings & Linings, United States, 2002, vol. 19.8, pp. 42-47.

* cited by examiner

*Primary Examiner* — Rabon Sergent
(74) *Attorney, Agent, or Firm* — John E. Mrozinski, Jr.

(57) ABSTRACT

Two-component coating systems and compositions are disclosed. The coating compositions form crosslinked polyurea coatings and have relatively long pot life and relatively short dry time. The coating compositions include a polyisocyanate, a polyaspartic ester, and a polyetheraspartic ester.

17 Claims, No Drawings

POLYASPARTIC COATING COMPOSITIONS

This specification relates to coating systems and compositions comprising polyaspartic esters. This specification also relates to improving the curing properties of coating compositions comprising polyaspartic esters.

BACKGROUND OF THE INVENTION

Two-component coating systems and compositions based on polyurethanes and/or polyureas are widely used in industry because of the many advantageous properties exhibited by these coating chemistries. Two-component coating systems generally comprise a liquid binder component and a liquid hardener/crosslinker component. The liquid binder component may comprise an isocyanate-reactive component such a polyol or polyamine, and the liquid crosslinker component may comprise a polyisocyanate component. The addition reaction of the polyisocyanate component with the isocyanate-reactive component, produces highly crosslinked polyurea and/or polyurethane networks that form coating films when applied to substrates.

The reaction of polyisocyanates with polyamines results in highly crosslinked polyurea coatings that exhibit excellent mechanical and chemical resistance properties (e.g., abrasion, solvent, and weathering resistance). However, primary polyamines and polyisocyanates generally react together very rapidly to produce polyureas. Often, therefore, typical pot lives or gel times of two-component polyurea coating compositions are only between several seconds and a few minutes. Thus, polyurea coatings often cannot be applied manually, but must be applied using specialized spray equipment that accurately meters and mixes the binder and crosslinker components immediately before spray application.

SUMMARY OF THE INVENTION

In a non-limiting embodiment, a two-component coating system comprises a polyisocyanate, a polyaspartic ester, and a polyetheraspartic ester.

In another non-limiting embodiment, a two-component coating system comprises:
a polyisocyanate;
(B1) a polyaspartic ester corresponding to the following formula:

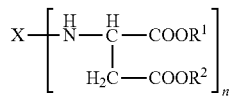

wherein:
n is an integer of 2 to 4;
X represents an aliphatic residue; and
$R^1$ and $R^2$ represent organic groups that are inert to isocyanate groups and that may be the same or different organic groups; and
(B2) an polyetheraspartic ester corresponding to the following formula:

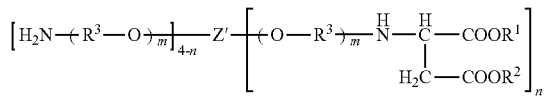

wherein:
n is an integer of 2 to 4;
m is independently an integer of 1 to 5;
Z' represents an alkyl residue;
$R^1$ and $R^2$ represent organic groups that are inert to isocyanate groups, and that may be the same or different organic groups; and
$R^3$ independently represents a $C_1$-$C_6$ alkyl residue.

It is understood that the invention disclosed and described in this specification is not limited to the embodiments summarized in this Summary.

The reader will appreciate the foregoing details, as well as others, upon considering the following detailed description of various non-limiting and non-exhaustive embodiments according to this specification.

DETAILED DESCRIPTION OF THE PREFERRED EMBODIMENTS

Various embodiments are described and illustrated in this specification to provide an overall understanding of the structure, function, properties, and use of the disclosed coating compositions and applied coatings. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112, first paragraph, and 35 U.S.C. § 132(a).

The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

In this specification; other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112, first paragraph, and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

A problem with prior two-component polyurea coating systems and compositions is that the combined liquid coating compositions can rapidly gel and cure, which severely limits pot life. Aliphatic primary polyamines, for example, generally react too rapidly with polyisocyanates to be formulated into a two-component coating system of acceptable commercial value. However, efforts to decrease the crosslinking rate of the polyisocyanates and polyamines that form polyurea coatings, thereby increasing the pot life of the mixed coating composition, also tend to simultaneously increase the cure time of a coating film applied to a substrate. The present inventors unexpectedly discovered that a mixture comprising one or more polyaspartic esters and one or more polyetheraspartic esters can be crosslinked with polyisocyanates while simultaneously exhibiting a relatively long pot life and a relatively short cure time.

Polyaspartic esters are sterically hindered secondary polyamines that react slower with polyisocyanates than primary polyamines. The controlled reactivity of polyaspartic esters is believed to be due to the sterically hindered environment of the secondary amine groups, which are located in a beta position relative to an ester carbonyl, and due to potential hydrogen bonding between the secondary amine groups and the ester carbonyl. Polyaspartic esters may be prepared by the Michael addition reaction of polyamines with dialkyl maleate. Like polyaspartic esters, polyetheraspartic esters are sterically hindered secondary polyamines. Polyetheraspartic esters may be prepared by the Michael addition reaction of polyetheramines with dialkyl maleate.

The present inventors unexpectedly discovered that the addition of polyetheraspartic esters to a binder component of a two-component polyurea coating system (the binder component also comprising polyaspartic esters) increases the curing rate (measured as Stage D dry-through time in accordance with ASTM D5895-03, Method B) of a coating film being crosslinked with a polyisocyanate hardener component, but that the addition of the polyetheraspartic esters does not decrease the pot life of the mixed coating composition (measured as time-dependent viscosity.

As used herein, the term "pot life" refers to the period of time from the initial mixture of two or more mutually reactive components of a coating system to the point at which the resulting coating composition exhibits a workable viscosity. As used herein, the term "cure time" refers to the time to achieve Stage D (Method B) as defined in ASTM D5895-03 (2008)—Standard Test Methods for Evaluating Drying or Curing During Film Formation of Organic Coatings Using Mechanical Recorder, which is incorporated by reference into this specification. Likewise, the term "cured" refers to the condition of a liquid coating composition in which a film formed from the coating composition achieves Stage D as defined in ASTM D5895-03 (2008). As used herein, the terms "cure" and "curing" refer to the progression of a liquid coating composition from the liquid state to a cured state. A Stage D drying condition as defined in ASTM D 5895-03 is equivalent to a "dry-through" condition.

The coating systems and compositions described in this specification may comprise two-component coating system and compositions. As used herein, the term "two-component" refers to a coating system or coating composition comprising at least two components that must be stored in separate containers because of their mutual reactivity. For instance, two-component polyurea coating systems and compositions may comprise a hardener/crosslinker component comprising an isocyanate-functional compound, and a separate binder component comprising a amino-functional compound. The two separate components are generally not mixed until shortly before application because of the limited pot life of the mixture. When the two separate components are mixed and applied as a film on a substrate, the mutually reactive compounds in the two components react to crosslink and form a cured coating film.

As used herein, the term "coating system" refers to a set of chemical components that may be mixed to form an active coating composition that may be applied and cured to form a coating film. As used herein, the term "coating composition" refers to a mixture of chemical components that will cure and form a coating when applied. Accordingly, a coating composition may be formed from a coating system by mixing the chemical components comprising the coating system. Furthermore, when a list of constituents is provided in this specification that are individually suitable for forming the components of the coating system or coating composition described herein, it should be understood that various combinations of two or more of those constituents, combined in a manner that would be known to those of ordinary skill in the art reading this specification, may be employed and is contemplated.

Two-component coating systems and compositions comprise at least two mutually reactive compounds. The two mutually reactive compounds may be referred to as a binder and a hardener/crosslinker. As used herein, the term "binder"

refers to the component of a two-component coating system or composition that comprises an amino-functional resin. As used herein, the terms "hardener" and "crosslinker" are synonymous and refer to the component of a two-component coating system or composition that comprises a polyisocyanate. For example, in a two-component polyurea coating system or composition, the binder may comprise a polyaspartic ester and/or a polyetheraspartic ester, and the hardener/crosslinker may comprise a polyisocyanate. When mixed, a polyamine binder and a polyisocyanate hardener/crosslinker may react to form a crosslinked polymer network comprising linkages.

As used herein, the term "polyisocyanate" refers to compounds comprising at least two un-reacted isocyanate groups. Polyisocyanates include diisocyanates and diisocyanate reaction products comprising, for example, biuret, isocyanurate, uretdione, urethane, urea, iminooxadiazine dione, oxadrazine trione, carbodiimide, acyl urea, allophanate groups, and combinations of any thereof. As used herein, the term "polyamine" refers to compounds comprising at least two free primary and/or secondary amine groups. Polyamines include polymers comprising at least two pendant and/or terminal amine groups.

The polyisocyanate component (A) may include any of the known polyisocyanates of polyurethane chemistry. Examples of suitable lower molecular weight polyisocyanates (e.g., having a molecular weight of 168 to 300 g/mol) include, but are not limited to, 1,4-tetra-methylene diisocyanate; methylpentamethylene diisocyanate; 1,6-hexamethylene diisocyanate (HDI); 2,2,4-trimethyl-1,6-hexamethylene diisocyanate; 1,12-dodecamethylene diisocyanate; cyclohexane-1,3- and -1,4-diisocyanate; 1-isocyanato-2-isocyanatomethyl cyclopentane; 1-isocyanato-3-isocyanatomethyl-3,5,5-trimethyl-cyclohexane (isophorone diisocyanate or IPDI); bis-(4-isocyanato-cyclohexyl)-methane; 1,3- and 1,4-bis-(isocyanatomethyl)-cyclohexane; bis-(4-isocyanato-cyclo-hexyl)-methane; 2,4'-diisocyanato-dicyclohexyl methane; bis-(4-isocyanato-3-methyl-cyclohexyl)-methane; α,α,α',α'-tetramethyl-1,3- and/or -1,4-xylylene diisocyanate; 1-isocyanato-1-methyl-4(3)-isocyanatomethyl, cyclohexane; 2,4- and/or 2,6-hexahydro-toluylene diisocyanate; 1,3- and/or 1,4-phenylene diisocyanate; 2,4- and/or 2,6-tolune diisocyanate; 2,4- and/or 4,4'-diphenylmethane diisocyanate (MDI); 1,5-diisocyanato naphthalene; and combinations of any thereof.

In various embodiments, polyisocyanate component (A) may comprise an aliphatic diisocyanate, an aliphatic diisocyanate adduct, or an aliphatic diisocyanate prepolymer. Suitable aliphatic diisocyanates include, for example, hexamethylene diisocyanate (HDI); isophorone diisocyanate (IPDI); 2,4'- and/or 4,4'-diisocyanato-dicyclohexyl methane; adducts thereof; and prepolymers comprising residues thereof.

Additional suitable polyisocyanate components include derivatives of the above-mentioned monomeric diisocyanates. Suitable diisocyanate derivatives include, but are not limited to, polyisocyanates containing biuret groups as described, for example, in U.S. Pat. Nos. 3,124,605 and 3,201,372, which are incorporated by reference into this specification. Suitable diisocyanate derivatives also include, but are not limited to, polyisocyanates containing isocyanurate groups (symmetric trimers) as described, for example, in U.S. Pat. No. 3,001,973, which is incorporated by reference into this specification. Suitable diisocyanate derivatives also include, but are not limited to, polyisocyanates containing urethane groups as described, for example, in U.S. Pat. Nos. 3,394,164 and 3,644,457, which are incorporated by reference into this specification. Suitable diisocyanate derivatives also include, but are not limited to, polyisocyanates containing carbodiimide groups as described, for example, in U.S. Pat. No. 3,152,162, which is incorporated by reference into this specification. Suitable diisocyanate derivatives also include, but are not limited to, polyisocyanates containing allophanate groups. Suitable polyisocyanates also include, but are not limited to, polyisocyanates containing uretdione groups.

In various embodiments, component (A) may comprise an asymmetric diisocyanate trimer (iminooxadiazine dione ring structure) such as, for example, the asymmetric diisocyanate trimers described in U.S. Pat. No. 5,717,091, which is incorporated by reference into this specification. In various embodiments, component (A) may comprise an asymmetric diisocyanate trimer based on hexamethylene diisocyanate (HDI); isophorone diisocyanate (IPDI); or a combination thereof.

Isocyanate group-containing prepolymers and oligomers based on polyisocyanates may also be used as the polyisocyanate component (A). Polyisocyanate-functional prepolymers and oligomers may have an isocyanate content ranging from about 0.5% to 30% by weight, and in some embodiments, about 1% to 20% by weight, and may be prepared by the reaction of starting materials, such as, for example, isocyanate-reactive compounds such as polyols, at an NCO/OH equivalent number ratio of about 1.05:1 to 10:1, and in some embodiments, about 1.1:1 to 3:1.

Examples of other suitable polyisocyanates that may be used as component (A) alone or in combination with each other, and/or in combination with any of the polyisocyanates described above, include the polyisocyanates described in U.S. Pat. Nos. 5,126,170; 5,236,741; 5,489,704; 5,243,012; 5,736,604; 6,458,293; 6,833,424; 7,169,876; and in U.S. Patent Publication No. 2006/0247371, which are incorporated by reference into this specification.

The polyaspartic ester component (B1) may include one or more polyaspartic esters corresponding to formula (I):

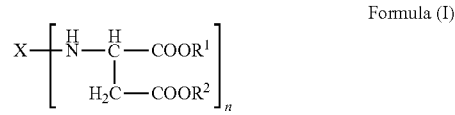

Formula (I)

wherein:
n is an integer of 2 to 4
X represents an aliphatic residue;
$R^1$ and $R^2$ represent organic groups that are inert to isocyanate groups under reaction conditions and that may be the same or different organic groups; and
n is at least 2.

In formula (I), the aliphatic residue X may correspond to a straight or branched alkyl and/or cycloalkyl residue of an n-valent polyamine that is reacted with a dialkylmaleate in a Michael addition reaction to produce a polyaspartic ester. For example, the residue X may correspond to an aliphatic residue from an n-valent polyamine including, but not limited to, ethylene diamine; 1,2-diaminopropane; 1,4-diaminobutane; 1,6-diaminohexane; 2,5-diamino-2,5-dimethylhexane; 2,2,4- and/or 2,4,4-trimethyl-1,6-diaminohexane; 1,11-diaminoundecane; 1,12-diaminododecane; 1-amino-3,3,5-trimethyl-5-amino-methylcyclohexane; 2,4'- and/or 4,4'-diaminodicyclohexylmethane; 3,3'-dimethyl-4,4'-diaminodicyclohexylmethane; 2,4,4'-triamino-5-methyldicyclohexylmethane; polyether polyamines with aliphatically bound primary amino groups and having a number average molecular weight ($M_n$) of 148 to 6000 g/mol; isomers of any thereof, and combinations of any thereof.

In various embodiments, the residue X may be obtained from 1,4-diaminobutane; 1,6-diaminohexane; 2,2,4- and/or 2,4,4-trimethyl-1,6-diaminohexane; 1-amino-3,3,5-trimethyl-5-aminomethylcyclohexane; 4,4'-diaminodicyclohexylmethane; 3,3'-dimethyl-4,4'-diaminodicyclohexylmethane; or 1,5-diamine-2-methyl-pentane.

The phrase "inert to isocyanate groups under reaction conditions," which is used to define groups $R_1$ and $R_2$ in formula (I), means that these groups do not have Zerevitinov-active hydrogens. Zerevitinov-active hydrogen is defined in Rompp's Chemical Dictionary (Rommp Chemie Lexikon), 10th ed., Georg Thieme Verlag Stuttgart, 1996, which is incorporated by reference into this specification. Generally, groups with Zerevitinov-active hydrogen are understood in the art to mean hydroxyl (OH), amino ($NH_x$), and thiol (SH) groups. In various embodiments, $R_1$ and $R_2$, independently of one another, are $C_1$ to $C_{10}$ alkyl residues, such as, for example, methyl, ethyl, or butyl residues.

In various embodiments, polyaspartic ester component (B1) comprises one or more compounds corresponding to formula (I) in which n is an integer from 2 to 6, in some embodiments from 2 to 4, and in some embodiments 2. In embodiments, where n=2, polyaspartic ester component (B1) may comprise one or more compounds corresponding to formula (II):

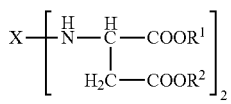

Formula (II)

The polyaspartic ester component (B1) may be produced by reacting the corresponding primary polyamines of the formula:

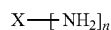

with maleic or fumaric acid esters of the formula:

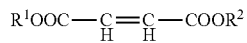

Examples of suitable polyamines include the above-mentioned diamines. Examples of suitable maleic or fumaric acid esters include dimethyl maleate, diethyl maleate, dibutyl maleate, and the corresponding fumarates.

The production of the polyaspartic ester component (B1) from the above-mentioned polyamine and maleic/fumaric acid ester starting materials may take place within a temperature range of 0° C. to 100° C. The starting materials may be used in amounts such that there is at least one equivalent, and in some embodiments approximately one equivalent, of olefinic double bonds in the maleic/fumaric acid esters for each equivalent of primary amino groups in the polyamine. Any starting materials used in excess may be separated off by distillation following the reaction. The reaction may take place in the presence or absence of suitable solvents, such as methanol, ethanol, propanol, dioxane, or combinations of any thereof.

In various embodiments, the polyaspartic ester component (B1) may comprise a reaction product of two equivalents of diethyl maleate with one equivalent of 1,5-diamine-2-methyl-pentane; 4,4'-diaminodicyclohexylmethane; or 3,3'-dimethyl-4,4'-diaminodicyclohexylmethane. These reaction products may have the molecular structures shown in formulas (III)-(V), respectively:

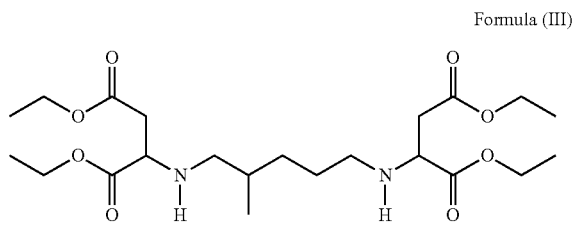

Formula (III)

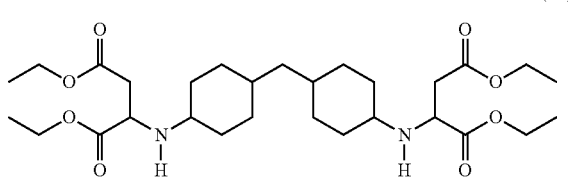

Formula (IV)

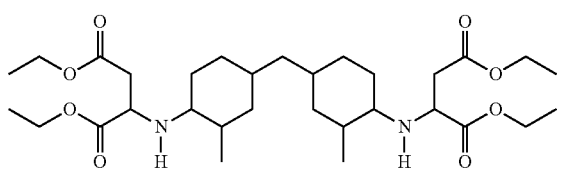

Formula (V)

In various embodiments, the polyaspartic ester component (B1) may comprise a mixture of any two or more polyaspartic esters, and in some embodiments, a mixture of any two of the polyaspartic esters shown in Formulas (II)-(IV). The polyaspartic ester component (B1) may also comprise a mixture of the three polyaspartic esters shown in Formulas (II)-(IV).

Examples of other suitable polyaspartic esters that may be used as component (B1) alone or in combination with each other, and/or in combination with any of the polyaspartic esters described above, include the polyaspartic esters described in U.S. Pat. Nos. 5,126,170; 5,236,741; 5,489,704; 5,243,012; 5,736,604; 6,458,293; 6,833,424; 7,169,876; and in U.S. Patent Publication No. 2006/0247371, which are incorporated by reference into this specification. In addition, suitable polyaspartic esters are commercially available from Bayer MaterialScience LLC, Pittsburgh, Pa., USA, under the tradenames Desmophen NH 1220, Desmophen NH 1420, Desmophen NH 1520, and Desmophen NH 1521.

The polyetheraspartic ester component (B2) may include one or more polyaspartic esters corresponding to formula (VI):

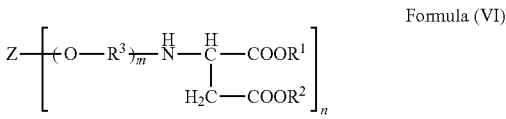

Formula (VI)

wherein:
n is an integer of 2 to 4;
m is independently an integer of 1 to 5;
Z represents an aliphatic residue;
$R^1$ and $R^2$ represent organic groups that are inert to isocyanate groups under reaction conditions and that may be the same or different organic groups; and
$R^3$ independently represents a $C_1$-$C_6$ alkyl residue.

Polyetheraspartic esters suitable for use in component (B2) may be prepared by reaction of a polyol starter molecule (having a hydroxyl-functionality of 2 to 4) with one or more $C_1$-$C_6$ epoxides to produce a terminal hydroxy-functional polyether (i.e., a polyether polyol having a hydroxyl-functionality of 2 to 4). The terminal hydroxyl groups may be converted to primary amine groups to produce a terminal amino-functional polyether (i.e., a polyether polyamine having a primary amino-functionality of 2 to 4). The polyether polyamine may be reacted with a dialkylmaleate in a Michael addition reaction to produce a polyetheraspartic ester (having secondary amino-functionality of 2 to 4 and a primary amino-functionality of 0 to 2, depending on the relative equivalent ratio of dialkylmaleate to primary amino groups in the Michael addition reaction).

In formula (VI), the aliphatic residue Z may correspond to a straight or branched alkyl and/or cycloalkyl residue of an n-valent polyol that is alkoxylated with a $C_1$-$C_6$ epoxide to produce a polyether polyol that is converted to a polyether polyamine (i.e., a polyether comprising at least 2 terminal primary amine groups). For example, the residue Z may correspond to an aliphatic residue from an n-valent polyol such as ethylene diol; 1,2-dihydroxypropane; 1,4-dihydroxybutane; 1,6-dihydroxyhexane; 2,2,4- and/or 2,4,4-trimethyl-1,6-dihydroxyhexane; 1-hydroxy-3,3,5-trimethyl-5-hydroxymethylcyclohexane; 4,4'-dihydroxydicyclohexyl methane; 3,3'-dimethyl-4,4'-dihydroxydicyclohexylmethane; 1,5-dihydroxy-2-methyl-pentane; 1,1,1-tris(hydroxymethyl)propane; and 2,2-bis(hydroxymethyl)1,3-propanediol (pentaerythritol).

It is also understood that the aliphatic residue Z in formula (VI) may comprise polyetheramine groups that do not react with the dialkylmaleate in the Michael addition reaction to produce the polyetheraspartic ester. Such polyetheramine groups may have the following formula:

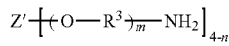

wherein Z' corresponds to the straight or branched alkyl and/or cycloalkyl residue of the original polyol starter molecule (e.g., ethyl, propyl, butyl, hexyl, cyclohexyl, dicyclohexylmethyl, 3,3'-dimethyl-dicyclohexylmethyl, 2-methyl-pentyl, 1,1,1-tris(methyl)propyl, or 2,2-bis(methyl)-propyl resides).

In this manner, a polyetheraspartic ester corresponding to formula (VI) may comprise n secondary amino groups, n dialkylmaleate residues, and 4-n primary amino groups, wherein n is an integer of 2 to 4. Such polyetheraspartic esters may correspond to formula (VII):

Formula (VII)
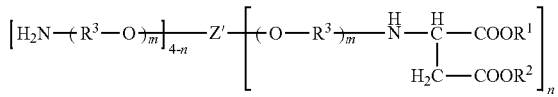

wherein:
n is an integer of 2 to 4;
m is independently an integer of 1 to 5;
Z' represents an alkyl residue;
$R^1$ and $R^2$ represent organic groups that are inert to isocyanate groups under reaction conditions and that may be the same or different organic groups; and
$R^3$ independently represents a $C_1$-$C_6$ alkyl residue.

Such polyetheraspartic esters may be prepared by employing an equivalent excess of primary amine groups relative to the equivalents of dialkylmaleate in the Michael addition reaction used to produce the polyetheraspartic ester from the polyether polyamine and dialkylmaleate reactants.

The phrase "inert to isocyanate groups under reaction conditions," which is used to define groups $R_1$ and $R_2$ in formula (VI), means that these groups do not have Zerevitinov-active hydrogens. Zerevitinov-active hydrogen is defined in Rompp's Chemical Dictionary (Rommp Chemie Lexikon), 10th ed., Georg Thieme Verlag Stuttgart, 1996, which is incorporated by reference into this specification. Generally, groups with Zerevitinov-active hydrogen are understood in the art to mean hydroxyl (OH), amino ($NH_x$), and thiol (SH) groups. In various embodiments, $R_1$ and $R_2$, independently of one another, are $C_{10}$ to $C_{10}$ alkyl residues, such as, for example, methyl, ethyl, or butyl residues.

In formula (VI), the $C_1$-$C_6$ alkyl residue $R^3$ may correspond to a straight or branched $C_1$-$C_6$ alkyl residue of one or more $C_1$-$C_6$ epoxides used to alkoxylate an n-valent polyol to produce a polyether polyol that is converted to a polyether polyamine that is reacted with dialkylmaleate to produce a polyetheraspartic ester. Suitable $C_1$-$C_6$ epoxides include, for example, ethylene oxide, propylene oxide, 1,2-butylene oxide, 2,3-butylene oxide, 1,2-pentylene oxide, 2,3-pentylene oxide, and the like. Accordingly, $C_1$-$C_6$ alkyl residues $R^3$ may be ethyl residues, propyl residues, butyl residues, pentyl residues, hexyl residues, isomers thereof, and combinations of any thereof.

In formula (VI), m is independently 1 to 5, and $R^3$ independently represents a $C_1$-$C_6$ alkyl residue. As used in this context, the term "independently" means that the identity of the alkyl residues $R^3$ in each nth polyether chain may be the same or different. Likewise, the number m of the alkoxy residues in each nth polyether chain may be the same or different.

Suitable polyether polyamines that may be reacted with dialkylmaleates in Michael addition reactions produce polyetheraspartic esters for component (B2) include the Jeffamine® polyetheramines commercially available from Huntsman Corporation, The Woodlands, Tex., USA.

By way of example, and without limitation, a polyetheraspartic ester corresponding to formula (VII) may be based on a tri-functional polyetheramine having repeating oxypropylene units produced by the propoxylation of 1,1,1-tris(hydroxymethyl)propane and conversion to the corresponding tri-amine. An equivalent of the resulting polyether polyamine may be reacted with two equivalents of diethylmaleate to produce a polyetheraspartic ester comprising two secondary amino groups, two diethylmaleate residues, and one primary amino group. Such a polyetheraspartic ester corresponds to formula (VII) wherein:
n is an integer of 3;
m is independently an integer of 1 to 5;
Z' represents a 1,1,1-tris(methyl)propyl residue;
$R^1$ and $R^2$ represent ethyl residues; and
$R^3$ represents isopropyl (1-methylethyl) residues.

This polyetheraspartic ester may correspond to formula (VIII):

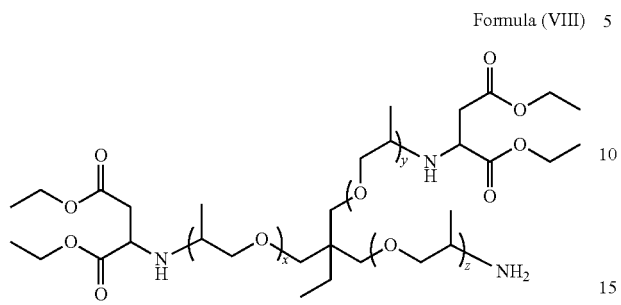

Formula (VIII)

wherein x, y, and z are independently an integer of 1 to 5.

In various embodiments, polyetheraspartic ester component (B2) may comprise a polyetheraspartic ester corresponding to formula (VIII). In formula (VIII), x+y+z may be an integer of 3 to 15, and in some embodiments, 4 to 8 or 5 to 6.

In addition to a polyisocyanate (A), a polyaspartic ester (B1), and a polyetheraspartic ester (B2), the two-component coating systems and compositions described in this specification may also comprise (B3) an aliphatic imine. Suitable aliphatic imines may have at least two structural units per molecule corresponding to formula (IX):

Formula (IX)

These optional components with capped amino functions, which are referred in this specification as polyaldimines and polyketimines, may have a molecular weight $M_n$ of 112 g/mol to 6500 g/mol, in some embodiments 140 g/mol to 2500 g/mol, and in some embodiments 140 g/mol to 458 g/mol. If the molecular weight cannot readily be determined as the sum of the atomic weights of the individual elements, it may, for example, be calculated from the functionality and the content of functional groups (established, for example, by determining the primary amino groups present after hydrolysis) or, in the case of higher molecular weight compounds, it may be determined by gel permeation chromatography using polystyrene as the standard.

The polyaldimines and polyketimines suitable for use in the coating systems and compositions disclosed in this specification may include compounds corresponding to formula (X):

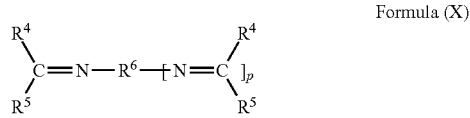

Formula (X)

wherein:

$R^4$ and $R^5$ are the same or different and represent hydrogen or a hydrocarbon group with up to 20 carbon atoms, or $R^4$ and $R^5$ form a 5-membered or 6-membered cycloaliphatic ring together with the carbon atom, $R^6$ is a (p+1)-valent residue obtained by removing the primary amino groups from a corresponding polyamine optionally containing oxygen and/or nitrogen atoms, and p is an integer from 1 to 3.

$R^4$ and $R^5$, independently of one another, may be alkyl residues with 1 to 8 carbon atoms.

The polyamine from which $R^6$ is obtained may have a number-average molecular weight $M_n$ of 88 g/mol to 2000 g/mol, In various embodiments, an imine component (B3) may comprise one or more compounds of formula (X) in which all $R^4$ groups represent hydrogen, all $R^5$ groups represent a hydrocarbon residue with up to 8 carbon atoms, and p=1.

The aldehydes and ketones that may be used for the production of the polyaldimines and polyketimines, respectively, may correspond to formula (XI):

Formula (XI)

and may have a molecular weight of 44 g/mol to 128 g/mol (aldehydes) and 58 g/mol to 198 g/mol (ketones).

Suitable aldehydes include, for example, acetaldehyde, propionaldehyde, n-butyraldehyde, isobutyraldehyde, trimethylacetaldehyde, 2,2-dimethylpropanal, 2-ethylhexanal, 3-cyclohexane-1-carboxaldehyde, hexanal, heptanal, octanal, valeraldehyde, benzaldehyde, tetrahydrobenzaldehyde, hexahydrobenzaldehyde, propargyl-aldehyde, p-toluylaldehyde, phenylethanal, 2-methylpentanal, 3-methylpentanal, 4-methylpentanal, sorbinaldehyde, and combinations of any thereof. Suitable ketones include, for example, acetone, methyl ethyl ketone, methyl propyl ketone, methyl isopropyl ketone, methyl butyl ketone, methyl isobutyl ketone, methyl tert-butyl ketone, methyl n-amyl ketone, methyl isoamyl ketone, methyl heptyl ketone, methyl undecyl ketone, diethyl ketone, ethyl butyl ketone, ethyl amyl ketone, diisopropyl ketone, diisobutyl ketone, cyclohexanone, cyclopentanone, methylcyclohexanone, isophorone, 5-methyl-3-heptanone, 1-phenyl-2-propanone, acetophenone, methyl nonyl ketone, dinonyl ketone, 3,3,5-trimethylcyclohexanone, and combinations of any thereof.

Mixtures of different ketones or aldehydes, as well as mixtures of ketones with aldehydes may also be used.

The polyamines used in the production of the polyaldimines and polyketimines are organic compounds having at least two, and in some embodiments 2 (p=1), aliphatically and/or cycloaliphatically bound primary amino groups. The polyamines generally have a number average molecular weight of 60 g/mol to 6,000 g/mol, in some embodiments 88 g/mol to 2000 g/mol, and in some embodiments 88 g/mol to 238 g/mol. Suitable polyamines for the production of the polyaldimines and polyketimines include the compounds previously mentioned for preparing polyaspartic esters (B1). Different polyamines can be used for the production of polyaspartic esters (B1) and the optional polyaldimines and polyketimines (B3), respectively.

The production of the polyaldimines and polyketimines may take place by reacting the starting components while maintaining a stoichiometric ratio of amino groups to aldehyde or keto groups of 1:1 to 1:1.5. To accelerate the reaction, catalytic quantities of acidic substances, such as, for example, p-toluenesulfonic acid, hydrogen chloride, sulfuric acid, or aluminum chloride, can optionally be incorporated.

The reaction generally takes place within the temperature range of 20° C. to 180° C., and is optionally carried out using an entrainer (e.g. toluene, xylene, cyclohexane, and/or octane) to remove the water of reaction until the calculated quantity of water (1 mole of water per mole of primary amino group) has been eliminated or until no more water is eliminated. The phases may then be separated or the entrainer and any un-reacted compounds present may be removed by distillation. The products thus obtained may be used together with components (B1) and (B2) without any further purification.

When polyaldimines and/or polyketimines are incorporated together with the aspartic esters, the weight ratio of aspartic esters (B1+B2) to the optional polyaldimines or polyketimines (B3) may be 99:1 to 5:95, and in some embodiments 80:20 to 20:80.

The two-component coating systems or compositions described in this specification may comprise conventional auxiliary agents or additives appropriate for the system or composition end use. For example, auxiliary agents or additives may include, but are not limited to, defoamers, rheology modifiers (e.g., thickeners), leveling agents, flow promoters, pigments, dispersing agents, catalysts, anti-skinning agents, anti-sedimentation agents, and/or emulsifiers.

The two-component coating systems or compositions may preferably further comprise organic solvents. Such solvents are known to those skilled in the art.

The two-component coating systems disclosed and described in this specification may be formulated by preparing a crosslinker component comprising the polyisocyanate (A) and by preparing a separate binder component comprising the polyaspartic ester (B1), the polyetheraspartic ester (B2), and, optionally, an aliphatic imine (B3). The crosslinker component and the binder component of the two-component coating systems are mixed together to form the two-component coating compositions, which may be applied to a substrate as a coating film and cured to form a coating.

The two-component waterborne coating systems and compositions described in this specification may be formulated so that the isocyanate-to-amine (NCO:NH$_x$) ratio of the polyisocyanate component (A) to the amino-functional components (B1), (B2), and optionally (B3) is 1:5 to 5:1, and in some embodiments, 1:3 to 3:1, 1:2 to 2:1, 1:1.5 to 1.5:1, 0.5:1 to 5:1, 1.5:1 to 3:1, or 1:1 to 1.5:1. The two-component coating systems and compositions described in this specification may be formulated so that an approximately 1:1 mixture by volume of a crosslinker component comprising polyisocyanate (A) and binder component comprising the amino-functional components (B1), (B2), and optionally (B3), forms a coating composition having an NCO:NH$_x$ ratio as described above, for example, in some embodiments 1:1, and in other embodiments, ranging from 1:1 to 1.5:1 or 1:1 to 1.3:1.

The coating compositions may be applied on to surfaces using various techniques, such as spraying, dipping, flow coating, rolling, brushing, pouring, and the like. Any solvents present in the applied coating evaporate, and the coatings cure and harden due to the urea-forming crosslinking reactions between the polyisocyanate and the amino-functional components. The crosslinking reactions may occur under ambient conditions or at higher temperatures of, for example, 40° C. to 200° C.

The coating compositions can be applied onto any compatible substrate, such as, for example, metals, plastics, ceramics, glass, and natural materials, and to substrates that have been subjected to any pre-treatment that may be desirable.

The non-limiting and non-exhaustive examples that follow are intended to further describe various non-limiting and non-exhaustive embodiments without restricting the scope of the embodiments described in this specification.

EXAMPLES

Unless otherwise specified, all percentages are to be understood as being percentages by weight.

Example-1

A polyetheraspartic ester was prepared by the Michael addition of 2 equivalents of diethylmaleate to one equivalent of Jeffamine® T-403 (an aliphatic tri-functional polyether polyamine containing oxypropylene units available from Huntsman Corporation). The Michael addition reaction was carried out by charging 1 molar equivalent of the Jeffamine® T-403 to a stirred vessel under nitrogen, slowly charging 2 molar equivalents of diethylmaleate to the vessel so to maintain the exotherm at less than 55° C., and maintaining the reaction mixture at 53° C. for approximately 18 hours. The resulting polyetheraspartic ester had a stabilized viscosity of 250 to 400 millipascals at 25° C. after aging for 6-8 weeks.

Two commercially available polyaspartic esters were used for comparative purposes: Desmophen® NH 1420 and Desmophen® NH 1520, Bayer MaterialScience LLC. Desmophen® NH 1420 is obtained by the Michael addition of one molar equivalent of 4,4'-diaminodicyclohexylmethane and two molar equivalents of diethyl maleate. Desmophen® NH 1520 is obtained by the Michael addition of one molar equivalent of 3,3'-dimethyl-4,4'-diaminodicyclohexylmethane and two molar equivalents of diethyl maleate. Desmophen® NH 1420 has a stabilized viscosity of 900 to 2,000 millipascals at 25° C. after aging for 6-8 weeks, and Desmophen® NH 1520 has a stabilized viscosity of 800 to 2,000 millipascals at 25° C. after aging for 16-18 weeks.

Example-2

The polyetheraspartic ester prepared in accordance with Example-1 was used to formulate a 100 g/L VOC two-component coating system. Comparative two-component coating systems are formulated with Desmophen® NH 1420, Desmophen® NH 1520, and a 33/67 weight percent blend of Desmophen® NH 1420 and Desmophen® NH 1520, respectively, for comparative purposes. The formulations are presented in Table 1 (parts by weight).

TABLE 1

|  | DES-1420 formulation | DES-1520 formulation | DES-1420/ 1520 formulation | Polyetheraspartic ester formulation |
|---|---|---|---|---|
| Desmophen ® NH 1420 | 45.01 | — | 15.18 | — |
| Desmophen ® NH 1520 | — | 45.68 | 30.37 | — |

TABLE 1-continued

| | DES-1420 formulation | DES-1520 formulation | DES-1420/1520 formulation | Polyetheraspartic ester formulation |
|---|---|---|---|---|
| Desmophen® XP 7076‡ | 6.01 | 6.10 | 6.08 | 6.31 |
| Polyetheraspartic ester | — | — | — | 47.30 |
| BYK-306 | 0.37 | 0.37 | 0.37 | 0.38 |
| BYK-A 530 | 0.73 | 0.74 | 0.74 | 0.77 |
| Eastman EEP solvent | 8.57 | 8.70 | 8.67 | 9.00 |
| Desmodur® XP 2410 | 39.32 | 38.41 | 38.6 | 36.24 |
| NCO:NH | 1.1:1 | 1.1:1 | 1.1:1 | 1.1:1 |

‡Desmophen® XP 7076 is a polyaldimine prepared by the addition of 2 molar equivalents of isobutyraldehyde (2-methylpropanal) to 1 molar equivalent of 5-amino-1-aminomethyl-1,3,3-trimethyl-cyclohexane (isophorone diamine, IPDA).

The pot life of the formulations was evaluated by measuring viscosity as a function of time. The results are presented in Table 2.

TABLE 2

| Pot Life Time (min) | DES1420/1520 formulation | Polyetheraspartic ester formulation | DES-1520 formulation | DES-1420 formulation |
|---|---|---|---|---|
| 5 | 236 | 230 | 244 | 292 |
| 10 | 262 | 254 | 256 | 416 |
| 15 | 316 | 306 | 274 | 608 |
| 20 | 374 | 378 | 292 | 866 |
| 25 | 456 | 482 | 310 | 1454 |
| 30 | 544 | 624 | 330 | 2140 |
| 35 | 754 | 788 | 354 | 3080 |
| 40 | 908 | 980 | 372 | 3670 |
| 45 | 1070 | 1232 | 394 | 5390 |
| 50 | 1272 | 1680 | 416 | 7340 |

The cure time of the coating compositions was evaluated by measuring the Gardner dry times of the formulations at approximately 70° F. to 72° F. and 25% and 50% relative humidity (RH). The results are presented in Table 3.

TABLE 3

| Cure Conditions | DES-1420 formulation | DES-1520 formulation | DES-1420/1520 formulation | Polyetheraspartic ester formulation |
|---|---|---|---|---|
| 72° F.; 50% RH | 45 min | >6 hr | 5 hr 50 min | 50 min |
| 71° F.; 25% RH | 1 hr* | >6 hr | >6 hr | 1 hr 30 min |

*This dry time was measured at 71° F. and 40% RH.

The time-dependent viscosity and, therefore, the pot life of the coating composition formulated with the polyetheraspartic ester was similar to that of the coating composition formulated with the 33/67 weight percent blend of Desmophen® NH 1420 and Desmophen® NH 1520. However, as shown in Table 3, the cure times of the coating composition formulated with the polyetheraspartic ester were substantially and significantly less than the cure times of the coating composition formulated with the 33/67 weight percent blend of Desmophen® NH 1420 and Desmophen® NH 1520. Accordingly, coating compositions comprising the polyetheraspartic ester may exhibit substantially and significantly decreased cure time while maintaining relatively long pot lives.

Examples 3A-3C

The polyetheraspartic ester prepared in accordance with Example-1 was used in admixture with either Desmophen® NH 1420 and Desmophen® NH 1520 or both to formulate various two-component coating systems. The formulations and results are shown below.

TABLE 3

| Example 3A | | | | |
|---|---|---|---|---|
| Raw Material | Weight | Volume | Weight Solids | Volume Solids |
| Component 1 | | | | |
| Desmophen NH 1420 | 6.65 | 0.76 | 6.65 | 0.76 |
| Desmophen NH 1520 | 9.32 | 1.06 | 9.32 | 1.06 |
| Polyetheraspartic Ester | 7.99 | 0.90 | 7.99 | 0.90 |
| Desmophen® XP 7076 | 2.66 | 0.37 | 2.66 | 0.37 |
| Byk-306 | 0.15 | 0.02 | 0.02 | 0.00 |
| Byk-A 530 | 0.35 | 0.05 | 0.02 | 0.00 |
| Eastman EEP Solvent | 4.21 | 0.53 | 0 | 0 |
| Subtotal Component 2 | 31.33 | 3.69 | 26.65 | 3.09 |
| Desmodur N-3900 | 18.67 | 1.94 | 18.67 | 1.94 |
| Subtotal Total | 18.67 | 1.94 | 18.67 | 1.94 |
| Total | 50.00 | 5.63 | 45.32 | 5.03 |

TABLE 4

| Example 3B | | | | |
|---|---|---|---|---|
| Raw Material | Weight | Volume | Weight Solids | Volume Solids |
| Component 1 | | | | |
| Desmophen NH 1420 | 5.95 | 0.68 | 5.95 | 0.68 |
| Desmophen NH 1520 | 8.33 | 0.95 | 8.33 | 0.95 |
| Polyetheraspartic Ester | 7.14 | 0.81 | 7.14 | 0.81 |
| Desmophen® XP 7076 | 2.38 | 0.33 | 2.38 | 0.33 |
| Byk-306 | 0.15 | 0.02 | 0.02 | 0.00 |
| Byk-A 530 | 0.35 | 0.05 | 0.02 | 0.00 |
| Eastman EEP Solvent | 9.01 | 1.14 | 0 | 0 |
| Subtotal Component 2 | 33.31 | 3.97 | 23.83 | 2.76 |
| Desmodur N-3900 | 16.69 | 1.74 | 16.69 | 1.74 |
| Subtotal Total | 16.69 | 1.74 | 16.69 | 1.74 |
| Total | 50.00 | 5.71 | 40.53 | 4.50 |
| Theoretical Results | | | | |
| Weight Solids | 81.05 | | Wt/Gal | 8.76 |
| Volume Solids | 78.86 | | Mix Ratio (volume) | 2.28:1 |
| P/B | 0 | | NCO:OH | 1.05 |
| PVC | 0 | | Theoretical VOC | 1.66 |
| Weight Solids | 90.65 | | Wt/Gal | 8.87 |
| Volume Solids | 89.34 | | Mix Ratio (volume) | 1.90:1 |
| P/B | 0 | | NCO:OH | 1.05 |
| PVC | 0 | | Theoretical VOC | 0.83 |

TABLE 5

Example 3C

| Raw Material | Weight | Volume | Weight Solids | Volume Solids |
|---|---|---|---|---|
| Component 1 | | | | |
| Desmophen NH 1420 | 88.72 | 10.08 | 88.72 | 10.08 |
| Desmophen NH 1520 | 124.21 | 14.11 | 124.21 | 14.11 |
| Potyetheraspartic Ester | 106.46 | 12.06 | 106.46 | 12.06 |
| Desmophen ® XP 7076 | 35.49 | 4.89 | 35.49 | 4.89 |
| Byk-306 | 2.59 | 0.34 | 0.32 | 0.04 |
| Byk-A 530 | 6.04 | 0.90 | 0.30 | 0.01 |
| Eastman EEP Solvent | 251.02 | 31.69 | 0 | 0 |
| Subtotal | 614.52 | 74.07 | 355.50 | 41.19 |
| Component 2 | | | | |
| Desmodur N-3900 | 248.89 | 25.93 | 248.89 | 25.93 |
| Subtotal | 248.89 | 25.93 | 248.89 | 25.93 |
| Total | | | | |
| Total | 863.41 | 100.00 | 604.39 | 67.12 |
| Theoretical Results | | | | |
| Weight Solids | 70.00 | Wt/Gal | | 8.63 |
| Volume Solids | 67.12 | Mix Ratio (volume) | | 2.86:1 |
| P/B | 0 | NCO:OH | | 1.05 |
| PVC | 0 | Theoretical VOC | | 2.59 |

TABLE 6

Results
The results below show the viscosity
build of the inventive systems over time.

| Time (min) | Example 3A | Example 3B | Example 3C |
|---|---|---|---|
| Initial | 276 | 97 | 33 |
| 5 | 408 | 125 | 39 |
| 10 | 606 | 186 | 48 |
| 15 | 891 | 290 | 62 |
| 20 | 1320 | 377 | 73 |
| 25 | 1911 | 536 | 91 |
| 30 | 2799 | 754 | 117 |
| 35 | 4009 | 1068 | 136 |
| 40 | 5793 | 1437 | 169 |
| 45 | 8308 | 2158 | 207 |
| 50 | 11840 | 2990 | 250 |
| 55 | 16610 | 5080 | 299 |
| 60 | 24491 | 6206 | 371 |
| Set-to-touch | 45 min | 45 min | 45 min |
| Hard Dry | 2 hr 5 min | 1 hr 50 min | 1 hr 45 min |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. A two-component coating system for the production of polyurea coatings, the coating system comprising:
   (A) a polyisocyanate;
   (B1) a polyaspartic ester corresponding to the following formula:

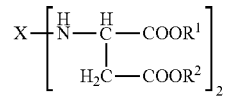

wherein:
   X represents an aliphatic residue; and
   $R^1$ and $R^2$ represent ethyl residues; and
   (B2) a polyetheraspartic ester corresponding to the following formula:

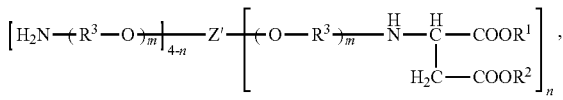

wherein:
   n is an integer of 3;
   m is independently an integer of 1 to 5;
   Z' represents a 1,1,1-tris(methyl)propyl residue;
   $R^1$ and $R^2$ represent ethyl residues; and
   $R^3$ represents isopropyl (1-methylethyl) residues.

2. The coating system of claim 1, wherein the polyisocyanate comprises an isocyanurate trimer of 1,6-hexamethylene diisocyanate.

3. The coating system of claim 1, wherein the polyisocyanate comprises an iminooxadiazine dione asymmetric trimer of 1,6-hexamethylene diisocyanate.

4. The coating system of claim 1, wherein the polyisocyanate comprises a diisocyanate adduct of isophorone diisocyanate.

5. The coating system of claim 1, wherein X is selected from the group consisting of a dicyclohexylmethane residue, a 3,3'-dimethyl-dicyclohexylmethane residue, and a 2-methyl-pentane residue.

6. The coating system of claim 1, wherein the ratio of un-reacted isocyanate groups to amine groups is 1:1 to 1.5:1.

7. The coating system of claim 1, further comprising an organic solvent.

8. The coating system of claim 1, further comprising:
   (B3) at least one of a polyaldimine and a polyketimine corresponding to the following formula:

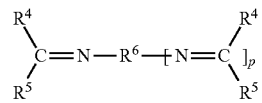

wherein:
   $R^4$ and $R^5$ independently represent hydrogen or a hydrocarbon group with up to 20 carbon atoms, or $R^4$ and $R^5$ form a 5-membered or 6-membered cycloaliphatic ring together with the carbon atom;
   $R^6$ is a (p+1)-valent residue obtained by removing the primary amino groups from a corresponding polyamine, optionally containing oxygen; and
   p is an integer from 1 to 3.

9. The coating system of claim 8, wherein (B3) comprises a polyaldimine comprising a reaction product of isobutyraldehyde and isophorone diamine.

10. A coating formed from the two-component coating system claim 1.

11. A two-component polyurea coating composition comprising:
(A) a polyisocyanate;
(B1) a polyaspartic ester corresponding to the following formula:

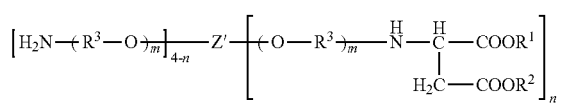

wherein:
Z' represents a 1,1,1-tris(methyl)propyl residue; and
$R^1$ and $R^2$ represent ethyl residues; and
(B2) a polyetheraspartic ester corresponding to the following formula:

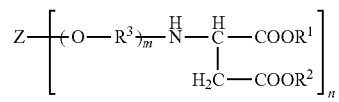

wherein:
n is an integer of 3;
m is independently an integer of 1 to 5;
Z represents a 1,1,1-tris(methyl)propyl residue;
$R^1$ and $R^2$ represent ethyl residues; and
$R^3$ represents isopropyl (1-methylethyl) residues.

12. The coating composition of claim 11, wherein the polyisocyanate comprises a polyisocyanate adduct selected from the group consisting of an isocyanurate trimer of 1,6-hexamethylene diisocyanate and an iminooxadiazine dione asymmetric trimer of 1,6-hexamethylene diisocyanate.

13. The coating composition of claim 11, further comprising:
(B3) at least one of a polyaldimine and a polyketimine corresponding to the following formula:

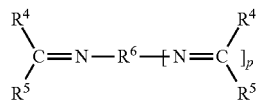

wherein:
$R^4$ and $R^5$ are independently hydrogen or a hydrocarbon group with up to 20 carbon atoms, or $R^4$ and $R^5$ form a 5-membered or 6-membered cycloaliphatic ring together with the carbon atom;
$R^6$ is a (p+1)-valent residue obtained by removing the primary amino groups from a corresponding polyamine, optionally containing oxygen; and
p is an integer from 1 to 3.

14. The coating composition of claim 13, wherein (B3) is a polyaldimine comprising a reaction product of isobutyraldehyde and isophorone diamine.

15. The coating composition of claim 11, wherein the ratio of un-reacted isocyanate groups to amine groups is 1:1 to 1.5:1.

16. The coating system of claim 11, further comprising an organic solvent.

17. A coating formed from the two-component coating composition of claim 11.

* * * * *